United States Patent [19]

Teramura

[11] 4,125,248
[45] Nov. 14, 1978

[54] BUTTERFLY VALVE

[75] Inventor: Masao Teramura, Hikone, Japan

[73] Assignee: Kazuhiko Nakajima, Shiga, Japan

[21] Appl. No.: 785,441

[22] Filed: Apr. 7, 1977

[30] Foreign Application Priority Data

Sep. 25, 1976 [JP] Japan ............................... 51-114879

[51] Int. Cl.² ............................................. F16K 1/22
[52] U.S. Cl. .................................................. 251/308
[58] Field of Search .................. 251/308, 305; 164/98, 164/112; 29/527.5, 156.4

[56] References Cited

U.S. PATENT DOCUMENTS

| 2,596,787 | 5/1952 | Ottinger | 251/305 |
| 3,215,400 | 11/1963 | Muller | 251/308 |
| 3,524,492 | 8/1970 | Janowsky | 164/98 |
| 3,596,876 | 8/1971 | Scaramucci | 251/308 |
| 3,697,042 | 10/1972 | Killian | 251/308 |

FOREIGN PATENT DOCUMENTS 689,303 2/1951 United Kingdom ..................... 251/305

Primary Examiner—William R. Cline
Assistant Examiner—H. Jay Spiegel
Attorney, Agent, or Firm—Morgan, Finnegan, Pine, Foley & Lee

[57] ABSTRACT

A butterfly valve including a valve disc provided with a diametrically extending through-hole consisting of large diameter portions at its opposite ends and a small diameter portion at its middle, and first and second valve stems mounted in the large diameter portions at the opposite ends of the through-hole of the valve disc so as to be rotatable integrally with the valve disc. The first and second valve stems are integrally connected together by a connecting rod extending through the small diameter portion at the middle of the through-hole of the valve disc.

4 Claims, 6 Drawing Figures

BUTTERFLY VALVE

BACKGROUND OF THE INVENTION

The present invention relates to improvements in a butterfly valve, more particularly to a valve disc and valve stem assembly which is the principal component of such valve.

As for a valve disc and valve stem assembly in a butterfly valve, two types of arrangements are known; one in which the valve disc is provided with a single diametrically extending through-hole whose diameter or cross-sectioal area is uniform throughout the length thereof and a single valve stem whose diameter or cross-sectional area is also uniform thrughout the length thereof is inserted in the through-hole of the valve disc and integrally fixed thereto as by a taper pin; and the other in which two independent blind holes whose diameter or cross-sectional area is uniform throughout the length thereof are formed at diametrically opposite peripheral regions of the valve disc and first and second or upper and lower valve stems which are independent of each other and whose diameter or cross-sectional area is uniform throughout the length thereof are inserted in the two blind holes of the valve disc, respectively, and either they are integrally fixed to the valve disc or the second valve stem is not fixed thereto but serves as a guide for rotation of the valve disc. These two types of arrangements are limited in use since they do not satisfy one of a high strength requirement and a low fluid flow resistance or pressure loss requirement.

Namely, in the former type of arrangement, the single valve stem is engaged with the valve disc over substantially the entire length thereof in the diametrical direction and the fluid pressure acting on the valve disc is uniformly distributed over the region of engagement between the valve stem and the valve disc and supported thereby substantially in a fixed beam or simple beam fashion, so that the strength is satisfactorily high and hence the assembly is suitable for use in a high pressure and large flow rate or large diameter fluid channel. In this type, however, the region corresponding to the through-hole which must of necessity be outwardly bulged and thick-walled from the standpoint of securing the strength of the valve disc extends diametrically throughout the valve disc and, moreover, the pin or the like by which the valve disc and the valve stem are integrally fixed together projects outwardly, so that the arrangement has the disadvantage of the flow resistance or pressure loss being high.

In the latter type of assembly, since the valve disc is formed with holes only at its peripheral regions and the thick-walled outward bulges corresponding to the hole forming regions are much smaller than in case of the former type of arrangement, this arrangement has the advantage of fluid flow resistance or pressure loss being negligible. But, since the first and second valve stems separate from each other independently support the fluid pressure acting on the valve disc in a cantilever fashion, equal forces do not necessarily act on the two valve stems. Particularly, high concentrated stresses act on some regions of contact between the valve disc and valve stems, causing wear or damage to the contact regions, so that fluid leakage tends to occur when the valve disc is closed. Thus, this assembly is applicable only when it is used in a low pressure and low flow rate or small diameter fluid channel.

SUMMARY OF THE INVENTION

An object of the present invention is to provide a butterfly valve including a valve disc and valve stem assembly which has a high strength and a low fluid flow resistance or pressure loss.

Another object of the present invention is to provide a butterfly valve including a valve disc having outward bulges only at peripheral regions thereof, which has a high strength.

A further object of the present invention is to provide a butterfly valve which has a high strength and a low fluid flow resistance or pressure loss and which is simple in construction and can be produced at low cost.

According to the present invention, in order to achive these objects, the valve disc is provided with a diametrically extending through-hole consisting of large diameter portions of large cross-sectional area at the opposite ends and a small diameter portion of small cross-sectional area at the middle, and first and second valve stems are mounted at their ends in the large diameter portions at the ends of the through-hole of the valve disc so as to be rotatable integrally with the valve disc. Moreover, first and second valve stems are connected together by a connecting rod or bar extending through the middle small diameter portion of the through-hole of the valve disc.

According to this arrangement of the present invention, the middle portion of the through-hole is small in diameter, so that the wall thickness necessary for securing the desired strength can be imparted to the region of the valve disc corresponding to the middle hole portion without outwardly bulging the same. In other words, the outwardly bulged portions can be limited in location to two diametrically opposite positions on the periphery of the valve disc, and the fluid flow resistance or pressure loss is, therefore, minimized. Further, since the valve disccand the first and second valve stems are substantially integrated in the axial direction of the valve stems and also in the rotative direction or circumferential direction thereof, the two valve stems substantially cooperate with each other to support the load acting on the valve disc, thus precluding the possibility of undesirable phenomena, such as wear and damage, occuring to the region of contact between the valve disc and valve stems due to concentrated stress.

The present invention will now be described with reference to the accompanying drawings illustrating an embodment of the butterfly valve according to the present invention.

DETAILED DESCRIPTION OF THE INVENTION

Figure 2A:
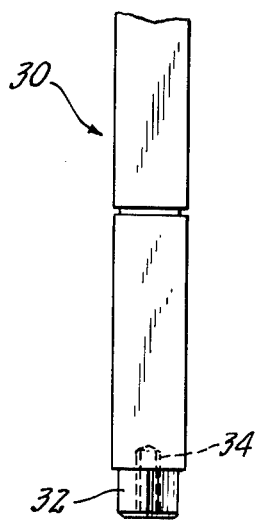
FIGS. 2A and 2B are side views of first and second valve stems, respectively, which constitute an embodiment of the butterfly valve according to the present invention.
Figure 2B:
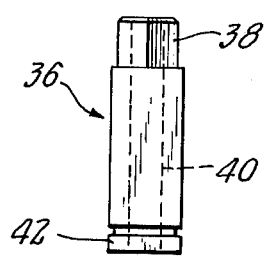
Figure 3:
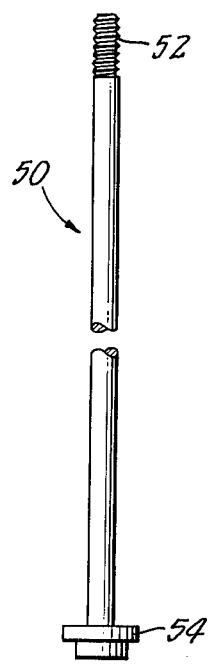
FIG. 3 is a side view of a connecting rod constituting an embodiment of the butterfly valve according to the present invention.

An illustrated butterfly valve according to the present invention includes a valve disc 10, first and second valve stems 30 and 36 and a connecting rod 50 as shown in FIGS. 1, 2 and 3.

Figure 1A:
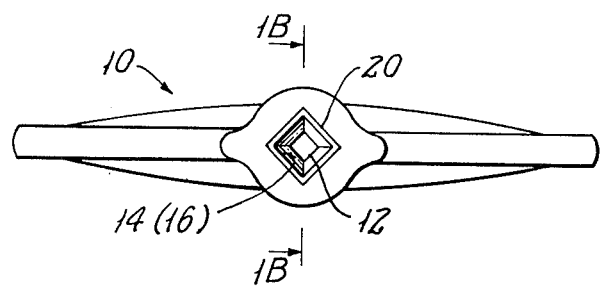
FIG. 1A is a plan view of a valve disc constituting an embodiment of the butterfly valve according to the present invention.
Figure 1B:
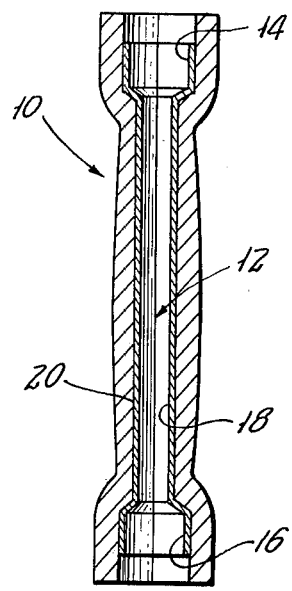
FIG. 1B is a sectional side view taken along the line IB—IB of FIG. IA.

The valve disc 10, as shown in FIGS. 1A and 1B, is provided with a diametrically extending through-hole 12 consisting of large diameter portions 14, 16 at the opposite ends and a small diameter portion 18 at the middle. The through-hole 12 is square in cross-section throughout the length thereof and is formed in such a manner that a square tubular member 20 having such through-hole 12 is used in a core fashion at the time of molding of the valve disc 10 so as to be welded or fused thereto. It has been found that formation of the through-hole in this way enables a structure of close dimensional tolerances to be obtained at low cost. As is clear from the drawings, the valve disc 10 has only the regions which correspond to the large diameter portions 14, 16 of the through-hole 12 outwardly bulged, with the other regions having a flat shape which has a low fluid flow resistance or pressure loss.

The first and second valve stems 30 and 36, as seen in FIGS. 2A and 2B, are provided with square portions 32 and 38 at one of their respective ends adapted to be engaged with the large diameter portions 14 and 16 of the through-hole 12 of the valve disc, respectively. The square portion 32 of the first valve stem 30 is centrally formed with an axially extending threaded hole 34, while the second valve stem 36 is centrally formed with an unthreaded hole 40 axially extending throughout the length thereof.

Finally, the connecting rod 50 is in the form of a small diameter slender or elongated member adapted to be inserted in the unthreaded hole 40 of the second valve stem 36 and in the through-hole 12 of the valve disc 10, and it is provided at one end thereof with a threaded portion 52 adapted to be engaged with the threaded hole 34 at one end of the first valve stem 30 and at the other end with a bolt head 54 adapted to be engaged with the end face 42 at the other end of the second valve stem 36 (see FIG. 3).

Figure 4:
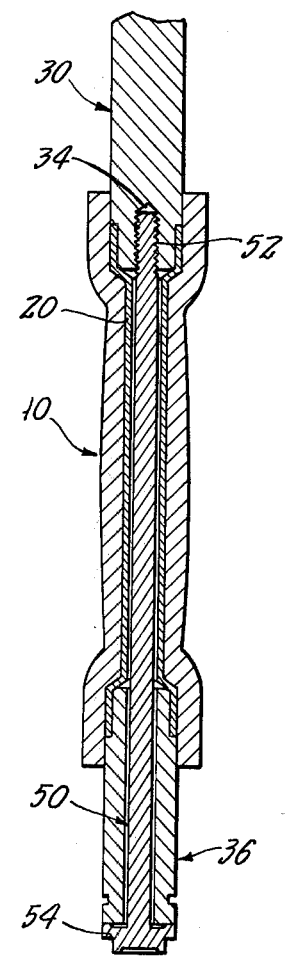
FIG. 4 is a side view showing the valve disc, valve stems and connecting rod of FIGS. 1 to 3 in assembled condition.

The valve disc 10, the first and second valve stems 30, 36 and the connecting rod 50 constructed in the manner described above are assembled together, as shown in FIG. 4. This assembling operation may be carried out as follows: First of all, the square portions 32 and 38 of the first and second valve stems 30 and 36 are inserted in the large diameter portions 14 and 16 of the through-hole 12 of the valve disc 10, respectively, so that they are integrated circumferentially or in the rotative direction of the valve stems 30 and 36 by engagement of the parts of square cross-section preventing relative rotation, and then the connecting rod 50 is passed from the side of the threaded part 52 through the unthreaded hole 40 of the second valve stem 36 and the central small diameter portion 18 of the through-hole 12 until the threaded portion 52 touches the threaded hole 34 of the first valve stem 30, whereupon the threaded portion 52 is screwed into the threaded hole 34 by aid of the bolt head 54 until the latter is pressed against the end face 42 of the second valve stem 36, thereby integrating them also axially of the valve stems 30 and 36.

It will be evident from the previous statement that the assembly of the valve disc 10 and valve stems 30 and 36 thus prepared has a sufficient strength.

The butterfly valve of the present invention may take other forms than the one described above. For example, the large diameter portions 14, 16 at the opposite ends of the through-hole 12 of the valve disc 10 and one of the respective ends of the first and second valve stems 30 and 36, which are to be engaged with each other so as to rotatable as a unit, may have other cross-sectional shape than the square shown in the drawings which does not allow relative rotation, i.e., cross-sectional shapes other than a circle. In some cases, a circular cross-sectional shape which allows relative rotation may be used. When such circular cross-sectional shape is used, however, it is necessary to use a coupling element such as a taper pin, key or cotter to couple the valve disc 10 with the first and second valve stems 30, 36 so as to assure unitary rotation of them.

Further, the connecting rod 50 may not be separate from the first and second valve stem 30, 36 as illustrated but be integral with the first valve stem 30 or the second valve stem 36. When the connecting rod 50 is made integral with the first valve stem 30, threaded hole which engages the threaded portion at the front end of the valve stem will be provided in the second valve stem 36.

As is clear from the foregoing, the butterfly valve according to the present invention has a high strength and a low fluid flow resistance or pressure loss, so that it can be used in both a low pressure and low flow rate or small diameter fluid channel and a high pressure and high flow rate or large diameter fluid channel.

What is claimed is:

1. A butterfly valve comprising a valve disc, a tubular member having a through-hole extending therethrough positioned in said valve disc to form a diametrically extending throuhg-hole in said valve disc, said through-hole consisting of large diameter portions at the opposite ends and a small diameter portion at the middle, said valve disc having outwardly bulging end regions proximate said large diameter portions of said through-hole and a middle region proximate said small diameter portion of said through-hole, said middle region being smaller in cross-sectional area than said outwardly bulging end regions so that said valve disc presents low fluid flow resistance or pressure loss, first and second valve stems having one of their respective ends engaged with said large diameter portions of said through-hole of said valve disc so as to be rotatable integrally with said valve disc, and a connecting rod extending through said small diameter portion of said through-hole of said valve disc to connect said first and second valve stems together into axial alignment with said valve disc.

2. A butterfly valve as defined in claim 1, wherein said large diameter portions at the opposite ends of said through-hole of said valve disc and one of the respective ends of said first and second valve stems engaged with said large diameter portions of said through-hole of said valve disc have a cross-sectional shape other than a circle which does not allow relative rotation.

3. A butterfly valve as defined in claim 1, wherein said connecting rod is provided at one end thereof with a threaded portion and at the other end thereof with a head engageable with an end face of said second valve stem at the other end of said second valve stem which does not engage said large diameter portion of said through-hole of said valve disc, while one end of said first valve stem which engages said large diameter portion of said through-hole of said valve disc is provided with a threaded portion adapted to be engaged by said threaded portion of said connecting rod and said first valve stem is provided with a through-hole adapted to receive said connecting rod.

4. A butterfly valve as defined in claim 1, wherein said connecting rod is made integral with said first or second valve stem and is provided with a threaded portion at the front end thereof, while one end of said second or first valve stem which engages said large diameter portion of said through-hole of said valve disc is provided with a threaded portion adapted to be engaged by said threaded portion of said connecting rod.

* * * * *